US008798249B2

(12) United States Patent
Kalpathy Narayanan

(10) Patent No.: US 8,798,249 B2
(45) Date of Patent: Aug. 5, 2014

(54) COMMUNICATION REMINDERS

(75) Inventor: Giridhar Kalpathy Narayanan, Hyderabad (IN)

(73) Assignee: Microsoft Corporation, Redmond, WA (US)

(*) Notice: Subject to any disclaimer, the term of this patent is extended or adjusted under 35 U.S.C. 154(b) by 1353 days.

(21) Appl. No.: 12/123,923

(22) Filed: May 20, 2008

(65) Prior Publication Data

US 2009/0290696 A1    Nov. 26, 2009

(51) Int. Cl.
*H04M 1/56* (2006.01)
*H04M 15/06* (2006.01)
*H04M 3/42* (2006.01)

(52) U.S. Cl.
USPC ................... 379/142.1; 379/210.01

(58) Field of Classification Search
USPC ............ 379/88.12, 142.01, 142.1, 142.15, 379/210.01, 211.01; 455/414.1, 415
See application file for complete search history.

(56) References Cited

U.S. PATENT DOCUMENTS

| | | | |
|---|---|---|---|
| 5,625,683 A | 4/1997 | Nazanin et al. ............... 379/355 |
| 6,041,103 A | 3/2000 | La Porta et al. .............. 379/67.1 |
| 6,621,800 B1 | 9/2003 | Klein ........................... 370/282 |
| 6,741,689 B2 | 5/2004 | Burg ........................ 379/201.01 |
| 6,757,533 B2 | 6/2004 | Lampela et al. .............. 455/415 |
| 6,766,007 B1 | 7/2004 | Dermler et al. .......... 379/201.01 |
| 6,993,497 B2 | 1/2006 | Yeh et al. ........................ 705/10 |
| 7,003,087 B2 | 2/2006 | Spencer et al. .......... 379/211.01 |
| 7,068,648 B2 | 6/2006 | Strathmeyer et al. ......... 370/352 |
| 7,145,998 B1 | 12/2006 | Holder et al. ............ 379/210.01 |
| 7,155,002 B2 | 12/2006 | Hagiwara ................ 379/210.01 |
| 7,233,229 B2 | 6/2007 | Stroupe et al. ............. 340/309.7 |
| 7,248,677 B2 | 7/2007 | Randall et al. ............. 379/93.23 |
| 2001/0019603 A1 | 9/2001 | McMahon .................... 379/67.1 |
| 2003/0063590 A1 | 4/2003 | Mohan et al. ................... 455/88 |
| 2004/0018830 A1 | 1/2004 | Pugliese ....................... 455/567 |
| 2004/0037403 A1 | 2/2004 | Koch ....................... 379/142.16 |
| 2005/0286687 A1 | 12/2005 | Sanmugasuntharam et al. .......................... 379/88.19 |
| 2006/0002536 A1* | 1/2006 | Ambrose ................. 379/201.01 |
| 2007/0004383 A1 | 1/2007 | Agozo ..................... 379/201.01 |
| 2007/0036302 A1 | 2/2007 | Cho ........................... 379/88.23 |
| 2007/0047726 A1 | 3/2007 | Jabbour et al. ........... 379/373.02 |
| 2007/0070940 A1* | 3/2007 | Veen et al. ..................... 370/328 |
| 2007/0071184 A1 | 3/2007 | Clift et al. ..................... 379/88.1 |
| 2007/0116246 A1 | 5/2007 | Walker et al. ............. 379/266.07 |
| 2007/0165607 A1 | 7/2007 | Mussman et al. ............. 370/352 |
| 2007/0174081 A1* | 7/2007 | Smith et al. ........................ 705/1 |
| 2007/0208798 A1 | 9/2007 | Kagawa et al. ............... 709/201 |
| 2007/0248221 A1* | 10/2007 | Chatterjee et al. ........ 379/211.02 |
| 2008/0226055 A1* | 9/2008 | Holder et al. ............ 379/210.01 |

(Continued)

OTHER PUBLICATIONS

Non-Final Office Action U.S. Appl. No. 12/123,818 mailed Apr. 26, 2011.

(Continued)

*Primary Examiner* — Quoc D Tran
(74) *Attorney, Agent, or Firm* — Andrew Smith; Micky Minhas

(57) ABSTRACT

Embodiments are configured to provide reminders associated with communications and other events. In an embodiment, components of a communication system can operate to generate, maintain, and implement reminders associated with communications and other events. A reminder can be automatically generated and scheduled for one or more users of the communication system when a user is unavailable or unable to take a call. Reminders can be generated to include information which can be used to establish a communication event for a subsequent communication associated with each reminder.

20 Claims, 7 Drawing Sheets

(56) References Cited

U.S. PATENT DOCUMENTS

| | | | |
|---|---|---|---|
| 2008/0273677 A1 | 11/2008 | Alfano et al. | 379/93.17 |
| 2009/0290693 A1 | 11/2009 | K. N. | 379/88.17 |
| 2010/0020948 A1 | 1/2010 | Takeda et al. | 379/88.17 |
| 2010/0093313 A1 | 4/2010 | Keihag | |

OTHER PUBLICATIONS http://www.voiceroundtable.com/adobe_pdf_files/audiopoint_comm_off.pdf, "Community Offering for the Audiopoint Service," John Craig with Joe Saunders, Bob Cuthriell and Nick Unger, 21 pages, Aug. 25, 2000.

http://ieeexploreleee.org/ie12/666/5208/00200771.pdf?tp=&isnumber=&arnumber=200771, "The Electronic Receptionist: A Knowledge-Based Approach to Personal Communications," Gifford, W.S. and Turock, D.L., Wireless Communications, 1992.

http://www.archive.org/details/tucows_197757_Talking_Caller_Id, Internet: Archive: Details: Talking Caller ID, 2 pages, Jul. 9, 2004.

http://www.callwave.com/Landing/internetAnsweringMachine_L1.asp, "Callwave for Home is your Internet Answering Machine," 2 pages, 2008.

http://nerdvittles.com/index.php?p=180, "Introducing Telephone Reminders 3.0: The Free Asterisk Telephone Reminder System," 7 pages, Jun. 1, 2007.

http://www.interruptions.net/literature/Dey-HUC00.pdf, "CybreMinder: A Context-Aware System for Supporting Reminders," Future Computing Environments Group, College of Computing and GVU Center, Georgia Institute of Technology, Atlanta, Georgia USA, 15 pages, 2000.

http://help2.virginmedia.com/help/getContent.jspx?page=h_telephony_advanced_reminder_call_2, "Reminder Call Help," 3 pages, Sep. 17, 2004.

U.S. Appl. No. 12/123,818, filed May 29, 2008 entitled "Conveying Call Subject Matter With Voice Data".

Office Action mailed Oct. 7, 2011, in co-pending U.S. Appl. No. 12/123,818.

* cited by examiner

COMMUNICATION REMINDERS

RELATED APPLICATIONS

This application is related to U.S. patent application Ser. No. 12/123,818, filed May 20, 2008, and entitled, "CONVEYING CALL SUBJECT MATTER WITH VOICE DATA," which is hereby incorporated by reference in its entirety.

BACKGROUND

Telephony generally refers to the use of equipment to provide voice communication over distances. Digital telephony uses digital features for telephone services and systems. Internet protocol (IP) telephony uses the Transmission Control Protocol/Internet Protocol (TCP/IP) to provide digitized voice data communications. Computer Telephony Integration ("CTI") enables computers to make and receive voice, fax, and data calls which can also include telephone directory, voicemail, and caller identification (ID) services. Users can become overwhelmed with the amount of information made available by various communication methods which can lead to missed opportunities. For example, a user may not be able to answer a call from an external network that is directed to the user's desktop device on a Voice Over IP (VoIP) network while in a meeting or on a cellular call.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide reminders associated with communications and other events. In an embodiment, components of a communication system can operate to generate, maintain, and implement reminders associated with communications and other events. A reminder can be automatically generated and scheduled for one or more users of the communication system when a user is unavailable or unable to take a call. Reminders can be generated to include information which can be used to establish a communication event for a subsequent communication associated with each reminder.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are configured to provide reminders associated with communications and other events. In an embodiment, components of a unified communication (UC) system can operate to generate, maintain, and implement reminders associated with communications and other events. Various client devices and applications of the UI system can be configured to enable access to multiple systems/application/devices, and also be used to communicate with one another, including generating and implementing reminders associated with communication events. For example, a user associated with the UC system can use a computer telephony device to decline or otherwise defer a call, wherein a future call can be automatically scheduled for a time when the user is available to take a call.

In another embodiment, a reminder application, which includes executable instructions, can be included with each communication device of a UC system. The reminder application or component can be used to automatically reschedule a call when a called party is unavailable or unable to take a call. The reminder application can also be used to schedule other events, and to trigger notifications at scheduled times. For example, the reminder application can be used to schedule one or more appointments, wherein an associated reminder or notification can be presented on a user device to alert the user of each appointment.

Call reminders can be used for users who receive numerous incoming calls and other communications during the typical day, wherein the users may not be in a position to take all calls. As described below, call reminders can be used to reschedule calls and/or complete the rescheduled calls at some subsequent time. Call reminders can be used in conjunction with calendar and contact applications and data repositories to make calls to designated parties, wherein the time for calls can be specified by a designated party or some other party. Call reminders can also be set on a recurring basis and include a snooze property of alarms. Other embodiments are described below.

Figure 1:
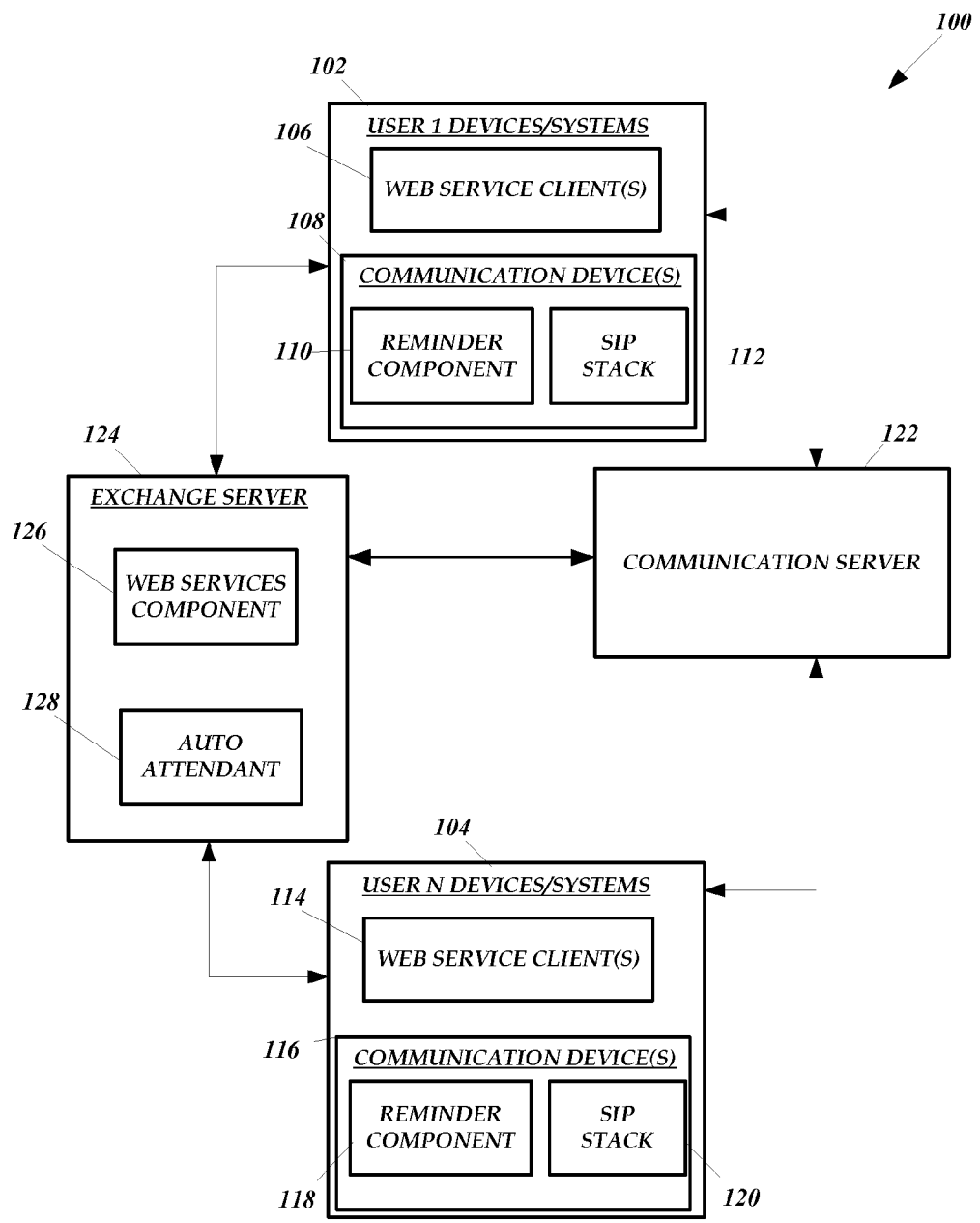
FIG. 1 is a diagram illustrating an exemplary communication system.

FIG. 1 is a diagram depicting an exemplary communication system 100. As described below, components of the system 100 can be used to generate, maintain, and implement reminders associated with communications and other events, but the system 100 is not so limited. A reminder can be used to remind one or more users of a subsequent communication event or other event. For example, components of the system 100 can be used to automatically schedule a call reminder for a subsequent call when one or more calling parties are unable or incapable of taking or receiving a call. In one embodiment, components of the system 100 can be used to automatically provide a call reminder when a user cannot answer or take a call for one reason or another. The call reminder can be made available to the calling and/or called parties for subsequent use. The call reminders can be associated with various communication or computing devices, which include, but are not limited to, computer telephony, handheld and mobile devices, desktop, laptop, and/or other communication and computing devices.

As shown in FIG. 1, the communication system 100 includes device/systems 102 associated with a user 1 and devices/systems 104 associated with an nth user (user N). That is, the communication system can include a plurality of users and associated devices/systems. For example, the devices/systems can include advanced computerized telephony devices, desktop computing devices, handheld/mobile devices, applications, and/or other communication and computing devices. Each user may have multiple devices/systems at his/her disposal. The devices/systems can be configured to execute communication applications to implement voice communications, data communications, video communications, etc. The devices/systems can also be configured to facilitate traditional phone calls through an external connection such as through a private branch exchange (PBX) and a public switched telephone network (PSTN).

The devices/systems 102 associated with user 1 include web service client(s) 106. For example, user 1 can use email applications, calendar applications, contact and other applications for business and personal uses. The devices/systems 102 also encompass communication device(s) 108. For example, user 1 can use a computerized telephony device that includes advanced functions as part of a networked environment. Additionally, user 1 may be using a cellular phone, personal data assistant (PDA), laptop, and desktop computers for business and personal needs.

As shown in FIG. 1, communication device(s) 108 includes a reminder component 110 and a session initiation protocol (SIP) stack 112. In an embodiment, the reminder component 110 can be configured as a web services sub-component which can be used to create, retrieve, modify, and/or delete call reminders, but is not so limited. In one embodiment, the reminder component 110 can be configured to generate CREATE ITEM, GET ITEM, and other messages which can be used to create and populate call reminders with information associated with a subsequent communication event.

The SIP stack 112 can operate to create and parse SIP messages. Business logic for each client is built on top of the SIP stack 112 to assist in establishing communications between user devices/systems. As described below, the SIP stack 112 can operate to communicate an invite request, parse the incoming provisional 1xx responses and any final response, such as 486 Busy Here for example. Client diagnostic information can be included in an additional header of a SIP message. The client diagnostic information can be used to communicate a reason for failure of establishment of the invite dialog. The additional header can also be used to pass on pertinent information that can be used to create call reminders.

The devices/systems 104 associated with user N also include web service client(s) 114, such as email applications, calendar applications, contact and other applications for example. The devices/systems 104 also encompass communication device(s) 116, such as a computerized telephony device that includes advanced functions as part of a networked environment. User N also may be using a cellular phone, personal data assistant (PDA), laptop, and desktop computers for business and personal needs. Communication device(s) 116 also includes a reminder component 118 and a session initiation protocol (SIP) stack 120. As described above, in an embodiment, the reminder component 110 can be configured as a web services sub-component that can operate to create, retrieve, modify, and/or delete call reminders. Operation and use of the SIP stack 120 has been described above in conjunction with SIP stack 112 for the user 1 devices/systems 102. A more detailed description of the functionality and operation of the reminder components is described further below.

With continuing reference to FIG. 1, the communication system 100 also includes a communication server 122 which operates to facilitate communications between end users, but is not so limited. In an embodiment, the communication server 122 can be configured as a UC server which includes registration, presence, instant messaging, routing, conferencing, VoIP, and other functionality. For example, the communication server 122 can be implemented using the functionality of the Microsoft® Office Communications Server. The communication server 122 also includes real-time conferencing hosted on servers inside a firewall and full-featured VoIP functionality that can be integrated with a PBX infrastructure. The communication server 122 can operate to communicate SIP requests to clients at all registered endpoints, including performing reverse lookup operations when extensions are dialed.

The communication system 100 also includes a collaboration server 124. For example, the collaboration server 124 can be deployed to include the functionality of the Microsoft Exchange Server®. The collaboration server 124 can be configured to manage user email, mailboxes, scheduling/calendar information, and contact information, but is not so limited. As an example, the collaboration server 124 can be deployed using functionality and features of the Microsoft Exchange Server® email, messaging, and communication infrastructure to manage user calendars, contacts, email, etc. According to an embodiment, and as shown in FIG. 1, the collaboration server 124 includes a web services component 126 and an auto attendant 128.

In one embodiment, the web services component 126 includes a number of sub-components which can include, but are not limited to: a managed folder service component, an exchange data service component, an availability service component, a synchronization service component, a notification service component, and/or an auto-discover service component. One or more components can be configured to be responsible for different services and roles of the collaboration server 124. The auto attendant 128 can be configured as an auto attendant menu system which can operate to transfer callers to an extension of a user or department without the intervention of a receptionist or an operator.

In one embodiment, the auto attendant 128 can assist in creating a call reminder when a call is redirected to a user's voicemail. For example, the auto attendant 128 can be used when a user calls a number from the PSTN or a non-IP based network into an enterprise which has a communication server 122 deployed with a PBX and a media gateway and/or a mediation server. Incoming calls can be re-directed to the auto attendant component 128 which can be hosted on the collaboration server 124 or the communication server 122. The auto attendant can be configured as an interactive voice response system (IVRS) which can includes an interactive voice menu and calendar integration. Correspondingly, call reminders can be created if a call issues from a non-intelligent or non-SIP device.

The collaboration server 124 can also operate to generate, manage, and/or maintain reminders, including call reminders, for users of the communication system 100. For example, the collaboration server 124 can use information associated with a declined call to create a call reminder for a subsequent call. Call reminders can be stored in a database component associated with the collaboration server 124, stored locally with the devices/systems of each user, and/or stored in a dedicated store. Each reminder component 108/118 can also operate to create call reminders for each user or both users, depending upon a particular configuration. For example, reminder component 108 can automatically operate to create a call reminder for user 1 when user N declines to take a call or is otherwise unavailable. Continuing with the example, the reminder component 108 can also be configured to create a call reminder for user N or can request the collaboration server 124 to create a reminder for one or both users of the system 100.

As described briefly above, call reminders can be generated or created to include information associated with a communication event. For example, call reminders can include contact, scheduling, and other information for identifying one or more parties and a scheduled time to participate in a subsequent call. In an embodiment, a call reminder can be created to include, but not limited to: user contact card details such as, display name, URIs, phone numbers, address, title, company, etc.; reminder time(s) (e.g., GMT, local time, etc.); reminder type such as one-way (for calling party), two-way (for calling and called party), recurring, etc.; recurring reminder settings; snooze option settings; preferred end-point details such as which devices/systems to call at a particular time; etc. For example, a user may want to receive calls on a cellular phone at certain times, at an office phone at other times, and at a home phone for all other times.

Call reminders can be used to remind one or more communication parties of a communication event. For example, a scheduled call reminder can be used to inform a user of a scheduled call or some other event. When a scheduled time associated with a call reminder occurs or is to occur, visual, audible, tactile, and/or other cues can issue from an associated communication or computing device to alert or inform a user of a scheduled call or event. For example, a user may configure a communication device to issue a distinct audible cue to alert the user of a call reminder. When a call reminder notification issues, a user may choose to take the call, delay the call further by selecting a snooze period, cancel the call, or reschedule and create a call reminder for some subsequent time.

As described above, according to an embodiment, call reminders can be created using the call reminder component which can be associated with a communication device. For example, a call reminder component can be installed and activated for use on each communication or computing device of a user. In one embodiment, each call reminder component can use information associated with a communicated diagnostic message to obtain information for use in creating call reminders. Each call reminder component can also be configured to use the functionality of a web service client to request information for use in creating call reminders. For example, a web service client 108/114 can be used to generate an extensible markup language (XML) request message that complies with the simple object access protocol (SOAP) standard to the collaboration server 124 when requesting information that can be included in a call reminder.

Upon receiving an information request, the collaboration server 124 can operate to verify credentials provided by a requesting client. Once the credentials are verified, the collaboration server 124 can automatically parse the XML included in the request to identify the information requested by the client. The collaboration server 124 can then generate a SOAP response that contains XML data that represents the requested information, including any strongly typed objects and the associated properties. For example, SOAP requests can be used as part of modification, creation, and/or deletion operations for call reminders associated with a user's mailbox being managed and maintained by the collaboration server 124. The collaboration server 124 can then communicate SOAP responses which include the XML data to the requesting client in an HTTP response. The requesting client can then operate to deserialize the SOAP response or responses and use XML data to reconstruct any strongly typed objects.

In one embodiment, the web services component 126 of the collaboration server 124 can be deployed to include a client access server role to obtain information for inclusion in a call reminder. For example, clients can connect to the collaboration server 124 using an hypertext transfer protocol secure (HTTPS) connection, wherein the collaboration server 124 has the client access server role installed in an Active Directory service site. If a target mailbox is part of a different Active Directory site, a source client access server can create an HTTPS connection to the target client access server.

The target client access server can also obtain information to be included in a reminder by communicating over a messaging application programming interface (MAPI) to the collaboration server 124 that has a mailbox server role installed. After receiving the requested information from the collaboration server 124, the target client access server can send the requested information back to the source client access server. However, if the target mailbox is in the same Active Directory site, the client access server can use MAPI to communicate with the collaboration server 124 to obtain the information. The client access server can then provide the data back to the requesting client.

As described above, embodiments are configured to create and use call reminders for communication events. For example, call reminders can be used in conjunction with a desktop communication or computing device, laptop, smart phone, personal data assistant (PDA), ultra-mobile personal computer, and/or other computing or communication devices to remind a user of a scheduled call. Components of system 100 described above can be implemented as part of networked, distributed, and/or other computer-implemented and communication environments.

The system 100 can be employed in a variety of computing/communication environments. For example, the system 100 can used with devices/systems having networking, security, and other communication components configured to provide communication functionality with other computing and/or communication devices. While a communication architecture is shown in FIG. 1, functionality of various components can be also combined or further divided. Additionally, the various embodiments described herein can be used with a number of applications, systems, and other devices and are not limited to any particular implementation or architecture.

Moreover, certain components and functionalities can be implemented in hardware and/or software. While certain embodiments include software implementations, they are not so limited and they encompass hardware, or mixed hardware/software solutions. Also, while certain functionality has been described herein, the embodiments are not so limited and can include more or different features and/or other functionality. Accordingly, the embodiments and examples described herein are not intended to be limiting and other embodiments are available.

Figure 2:
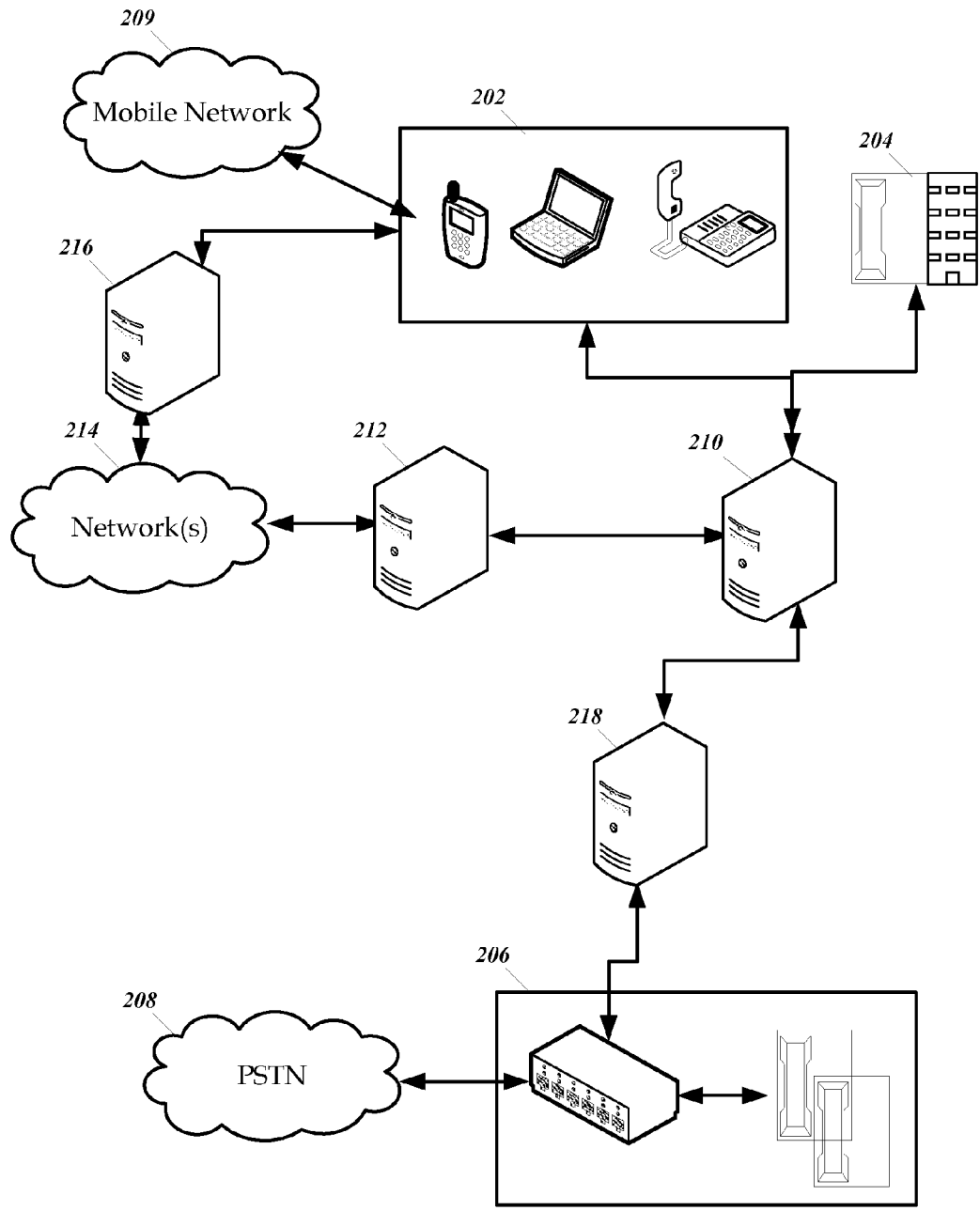
FIG. 2 is a diagram illustrating an exemplary unified communication (UC) system.

FIG. 2 depicts an exemplary architecture of a UC system 200. As shown in FIG. 2, devices 202 and 204 represent client devices of the UC system 200, which may execute communication applications such a voice communication, video communication, and other communication applications. In addition to their advanced functionality, the end devices may also facilitate traditional phone calls through an external connection such as through PBX 206 and Public Switched Telephone Network (PSTN) 208. End devices may include any type of smart phone, cellular or mobile phone, computer application, and advanced phone devices with additional functionality (e.g. computerized telephone 204). For example, a cellular or mobile device can receive calls through the UC system or through an external mobile network 209. Mobile network 209 can be any wireless communication network, such as a cellular network and include other components such as transceiver and other communication components.

UC server 210 provides registration, presence, and routing functionalities. Presence functionality enables the system to route calls to a user using any of the client devices assigned to the user based on default and/or user set policies. For example, if a call reminder is scheduled and the user is not available through a regular phone, the scheduled call may be forwarded to the user's mobile phone, and if the mobile phone is not answered, an auto-attendant may be used to automatically schedule a subsequent call reminder. Since the end devices can handle additional communication modes, UC server 210 is configured to provide access to additional communication modes (e.g. instant messaging, video communication, etc.) through access server 212.

Access server 212 can reside in a perimeter or other network and enables connectivity through network 214 with other users in one of the additional communication modes. Access server 212 can also be used to obtain information to be used in creating one or more call reminders. Mail server 216 can be used to store call reminders and to provide information to create call reminders to requesting clients. Mediation server 218 mediates signaling and media to and from the PBX 206. Mediation server 218 may also act as a Session Initiation Protocol (SIP) user agent (e.g. Business-To-Business User Agent "B2BUA"). PBX 206 includes a PBX controller and associated traditional phone devices. PBX 206 facilitates receipt and origination of calls through PSTN 208, which can include a combination of networks managed by a number of providers.

To illustrate the variety of communication systems that may be integrated employing various embodiments, PBX 206 may adhere to Session Initiation Protocol (SIP). The Session Initiation Protocol (SIP) is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients use Transport Control Protocol (TCP) or User Datagram Protocol ("UDP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, such as Real Time Protocol (RTP), RTP control protocol (RTCP), etc.

SIP is intended to provide a signaling and call setup protocol for IP-based communications that can support a superset of the call processing functions and features present in the PSTN. The focus of SIP is call-setup and signaling. SIP is also designed to enable the building of such features in network elements known as proxy servers and user agents. These are features that permit familiar telephone-like operations: dialing a number, causing a phone to ring, hearing ring back tones or a busy signal.

SIP-enabled telephony networks can also implement many of the more advanced call processing features. SIP can be described as a client/server protocol that enables peer-to-peer connectivity due in part because each side can function as a client and a server at the same time. Correspondingly, SIP requires a relatively simple core network with intelligence distributed to the network edge and embedded in endpoints (end devices/systems built in either hardware and/or software). SIP features can be implemented in the communicating endpoints (i.e. at the edge of the network) as opposed to being implemented in the network. While some example systems are described with SIP features, many other VoIP and communication protocols exist and embodiments may be implemented with any of those protocols using the principles described herein.

According to various embodiments, users can share the same identity in various communication systems. Correspondingly, an address associated with a shared identity can be used in inbound and outgoing calls. The shared identity is not limited to a phone number. The identity may take any form depending on the integrated networks, such as a telephone number, a SIP URI, or some other identifier. The shared identity can also be configured according to different formats. For example, a shared identity may include a phone number and a SIP URI (using an alias).

As an example, a user may be able to receive calls through a variety of end devices. Call reminders can also be retrieved and used from each one of the end devices. When a call reminder is associated with a Direct Inward Dial (DID) number, the call can be communicated to the UC system 100 and the PBX 206. A UC device/system registered to the user can be configured to receive a VoIP call from UC server 210 if the call reminder designates that the user would like to receive the call on a VoIP enabled device. As a result, the device/system can receive a Remote Call Control (RCC) notification of a call associated with the call reminder.

Figure 3:
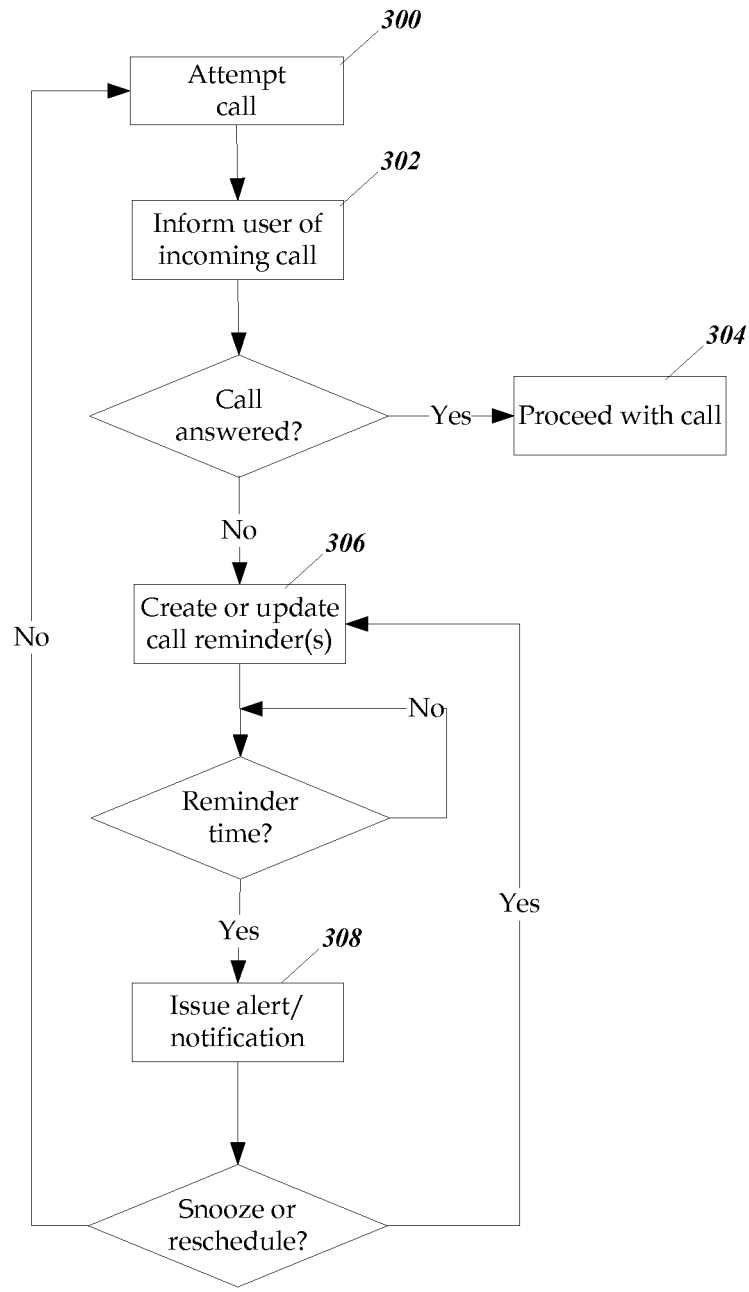
FIG. 3 is a flow diagram illustrating an exemplary process of creating and using call reminders.

FIG. 3 is a flow diagram illustrating an exemplary process of creating and using call reminders. Components of FIG. 1 are used in describing the flow diagram, but the described embodiments are not so limited. At 300, user 1 uses a device/system in an attempt to call user N. For example, user 1 can use a computer-based telephone, such as an office communicator phone, to call user N by selecting user N from a contact list. At 302, one or more of the devices/systems associated with user N inform user N of an incoming call. For example, user N's computer-based telephone may use a ring tone and/or or display a message, to alert user N of the incoming call.

If user N chooses to answer the incoming call, at 304 the users proceed with the call. At 306, if user N declines the call or if user 1 is directed to voicemail, a call reminder can be created for the uncompleted call or a call reminder can be updated if the current call is associated with a previously scheduled call reminder. As described above, reminder component 110 can use diagnostic information provided by the device/system of user N to create a call reminder when user N declines or chooses to defer a call. For example, user N's device/system/client can be configured to communicate a diagnostic message to reschedule the call, including a rescheduled time, and a reminder type which can be used to create a call reminder for one or more users.

Reminder component 110 and collaboration server 124 can also be used to create call reminders for one or both users. Call reminders can be created to include: a user display name; URI; phone number(s); recurring reminder settings; snooze settings; end-point preference; and/or other details and communication information. At 308, if a scheduled time associated with the call reminder occurs, the device/system of one user, or both users if a call reminder was created for both parties, can operate to issue an alert to notify the user(s) of the scheduled call. If a user chooses a delay time using a snooze option or opts to reschedule and defer the call for some time at 310, the flow returns to 306, and the call reminder can be updated or a new call reminder can be created. Otherwise, the flow returns to 300, and the scheduled call is attempted based in part on information associated with the call reminder.

Figure 4:
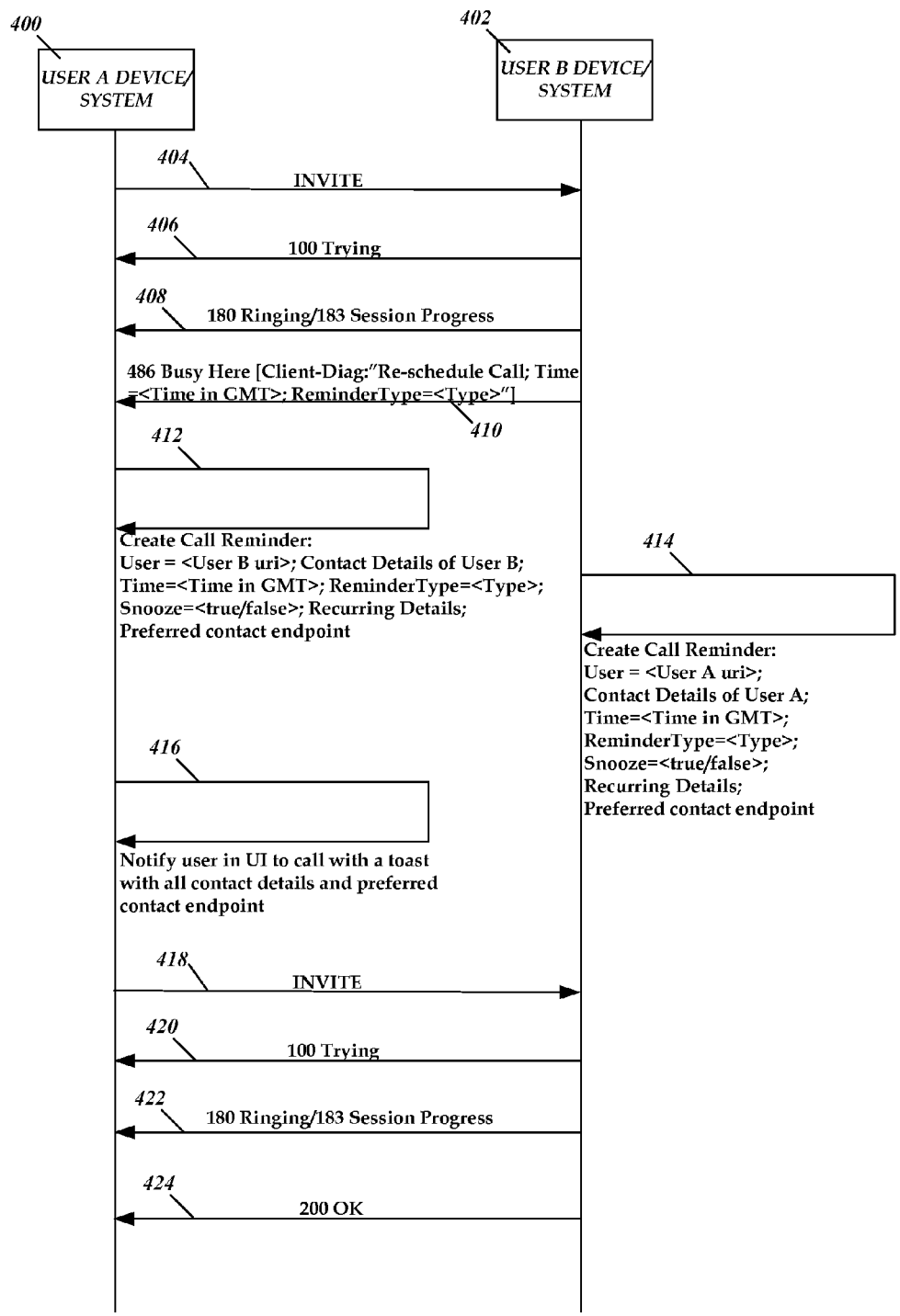
FIG. 4 illustrates an example of creating and using call reminders for users associated with an integrated telephony system.

FIG. 4 illustrates an example of creating call reminders for users associated with an integrated telephony system. As described above, a device/system can be configured to communicate a diagnostic message that includes information that can be used to create one or more call reminders. As shown in FIG. 4, user A is using a device/system 400 in an attempt to contact user B at a device/system 402. In an embodiment, user A is using a device/system 400 in an attempt to contact user B at a device/system 402 through a UC architecture. At 404, a call request is received by user B's device/system 402 with an INVITE message. For example, the INVITE message can be communicated through a VoIP gateway or other communication mechanism.

At 406, as part of the communication protocol of an embodiment, user B's device/system 402 communicates a "100 Trying" message at 406, and a "180 Ringing/183 Session Progress" message at 408. The "100 Trying" message can be used to indicate that an action is being taken to process the call. The "180 Ringing/183 Session Progress" messages can be used to indicate that the INVITE message has been received and that an alert is issuing for the call (e.g., ring tone, vibrate, etc.).

At 410, due in part to the unavailability of user B to take the current call, user B's device/system 402 communicates a "486 Busy Here" message which includes a header with information requesting a rescheduling of the call, including a scheduled time, and/or a reminder type. For example, user B may have declined the call by pressing a touch screen interface to decline the call and selecting a time for rescheduling the call from a drop-down menu (see FIG. 5A). At 412, a reminder component associated with user A's device/system 400 operates to create a call reminder to reschedule the call for user A.

As shown in FIG. 4, the call reminder under an embodiment can include user B's: URI; contact details; reschedule time; reminder type; snooze enable; recurring details; and, a preferred contact endpoint. As described above, according to one embodiment, the reminder component can communicate with a dedicated server to obtain the additional information to be included in the call reminder. For example, the call reminder can communicate with an exchange server provided by Microsoft® to obtain additional call reminder information.

At 414, a reminder component associated with user B's device/system 400 operates to create a call reminder to reschedule the call for user B. Alternatively, the reminder component associated with user A's device/system or a dedicated server can create the call reminder for user B. The call reminder for user B under an embodiment can include user A's: URI; contact details; reschedule time; reminder type; snooze enable; recurring details; and, a preferred contact endpoint. Again, the reminder component associated with user B can communicate with dedicated server to obtain additional information to be included in the call reminder. Alternatively, if a number if dialed, the reminder component can operate to perform a reverse number (or URI) lookup in a contact database. The contact database may be as simple as a list of phone numbers or as complicated as a global address book also associated with electronic mail, instant messaging, and other applications.

At 416, when the reminder time occurs or is to occur at some designated time (e.g., an early notice preceding the actual call reminder time), user A is notified in a user interface (UI) of the device/system of a notification (e.g., a toast) which includes the contact details and a preferred contact endpoint associated with the call reminder. If user A decides to make the call to user B based on the call reminder, at 418 a call request is received by user B's device/system 402 with another INVITE message at or about the scheduled time. At 420, user B's device/system 402 communicates a "100 Trying" message, and a "180 Ringing/183 Session Progress" message at 422. If user B takes the call, a "200 OK" message is communicated to user A's device/system at 424. While a certain order and number of operations are described with respect to FIGS. 3 and 4, the order and/or number of operations and/or components can be modified and/or reconfigured according to a desired implementation. Accordingly, other embodiments are available.

Figure 5A:
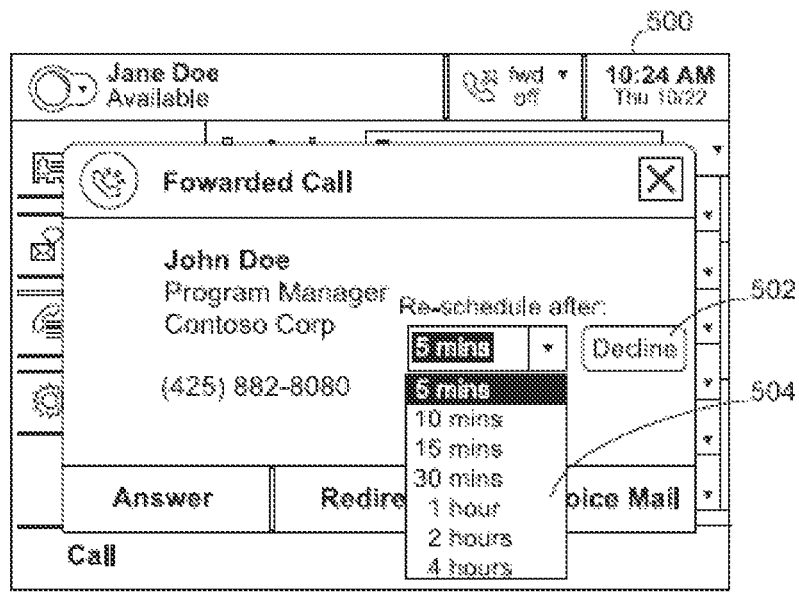
FIGS. 5A and 5B depict an exemplary user interface (UI) of a communication device that can be used in conjunction with one or more call reminders.
Figure 5B:
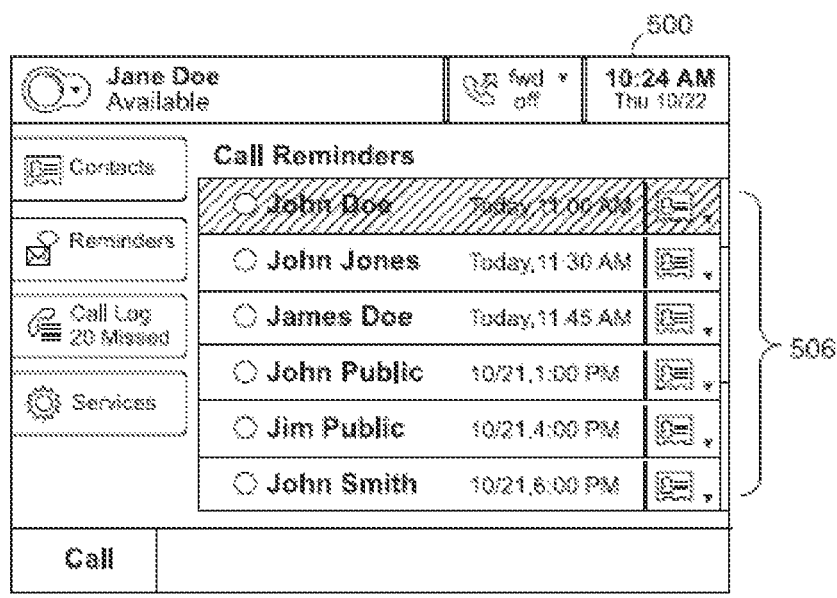

FIGS. 5A and 5B depict an exemplary UI 500 of a communication device, illustrating an interface to interact with and create call reminders. For example, a user can decline a call, reschedule a call, and/or review call reminders using aspects of the UI 500. As shown in FIG. 5A, the UI 500 includes an interactive item 502 that can be interacted with to decline a call. The UI 500 also includes a drop-down menu 504 which can be used to schedule a time for the call reminder. The caller's calling details can also be included for the callee's benefit. FIG. 5B depicts a number of call reminders 506 that have been scheduled for the current user. The user can peruse the call reminders 506, selecting call reminders for deletion, rescheduling, or implementing.

Some example scenarios are described below.

In one example, Alice makes a call to her manager Bob to talk to him about the status of a task assigned to her. However, Bob is involved in a planning meeting and would like to tell Alice to call him back an hour later. Accordingly, a call reminder can be created which includes information to ensure that Alice calls him back an hour later. Bob also wants to make sure that Alice calls before the end of day, at which time the information becomes useless. For example, a call reminder can be created reading: "Call with Alice—11:30 AM" on both, his own and Alice's exchange calendar which can be displayed in an associated communication device or devices.

In another scenario, Alice is away on a business trip to Hong-Kong. Steve, the UC designer, is trying to reach her to talk about some UI updates. He calls her but is directed to voicemail. Since Alice is available to take a call for an hour interval from 5 PM-6PM [in her current time zone], a call reminder can be created as soon as Steve reaches her voicemail for a portion or all of the published time. The call reminder can be created for Steve and/or Alice to call at 5:15-5:30 PM [Alice's time zone], since Steve is also available at that time. A dedicated server can be used to create the reminder with any attached subject to ensure that the communication occurs. Call reminders can be made available at all end-points where calendar data for the user can be retrieved via an exchange or other server.

Figure 6:
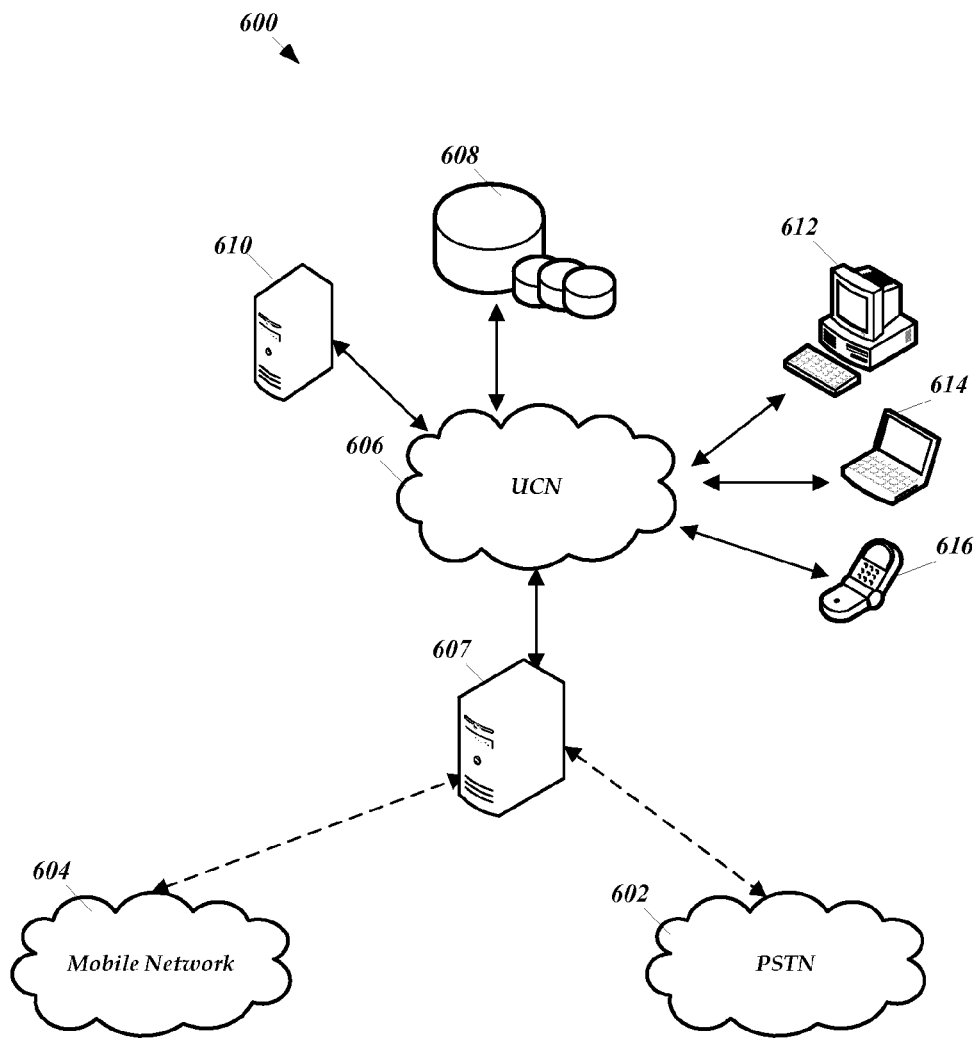
FIG. 6 illustrates an exemplary networked environment for implementation of various embodiments described herein.

FIG. 6 is an example networked environment 600, where embodiments may be implemented. Call reminders can be implemented in such a networked environment 600. As shown in FIG. 6, the networked environment includes a PSTN 602, mobile network 604, and UC network (UCN) 606, but is not so limited. In an embodiment, the networked environment 600 can be implemented in un-clustered systems or clustered systems employing a number of nodes communicating over one or more networks.

In various embodiments, the networked environment 600 can include a topology of servers, clients, devices, Internet service providers, communication media, and other network functionality. The networked environment 600 can also include a static or dynamic topology. The term "client" can refer to a client application, device, and/or system. While an integrated telephony system employing call reminders may involve greater or fewer components, certain components are discussed below.

A more advanced digital telephony system such as a UC system employing call reminder functionality may reside side-by-side with mobile networks, public switched networks, etc. and communicate through those networks with the help of PBX systems, gateways, etc. Mediation server(s) 607 can be configured to provide signaling and media exchange between various systems. The networked environment 600 may also include a UC server for registering, routing, and other functionality, and a mail server for maintaining user and other information, such as calendar information, call reminder information, contact information, etc.

Data associated with an architectural configuration (e.g. user names, phone numbers, call policies, configuration, records, etc.) can be stored in one or more data stores such as data stores 608, which can be directly or indirectly accessed by servers and/or clients or managed through a database server 610. The backbone of the UC system can be implemented using a UC network (UCN) 606, which can use a number of protocols such as SIP, RTP, etc. Client devices/systems (e.g., 612-616) can be configured as UCN user end points. Users can receive, access, and/or use call reminders using a client device or one or more client applications executing on a client device.

UCN 606 can include a secure network such as an enterprise network, an unsecure network such as a wireless open network, the Internet, or some other network or combination of networks. UCN 606 provides communication between nodes described herein. By way of example, and not limitation, UCN 606 can include wired media such as a wired network or direct-wired connection, and/or wireless media such as acoustic, radio frequency (RF), infrared, and/or other wireless media. Many other configurations of computing devices, applications, data sources, data distribution systems may be employed to implement call reminder functionality. Moreover, the networked environment 600 of FIG. 6 is included for illustrative purposes. Embodiments are not limited to the example applications, modules, devices/systems, or processes.

Exemplary Operating Environment

Figure 7:
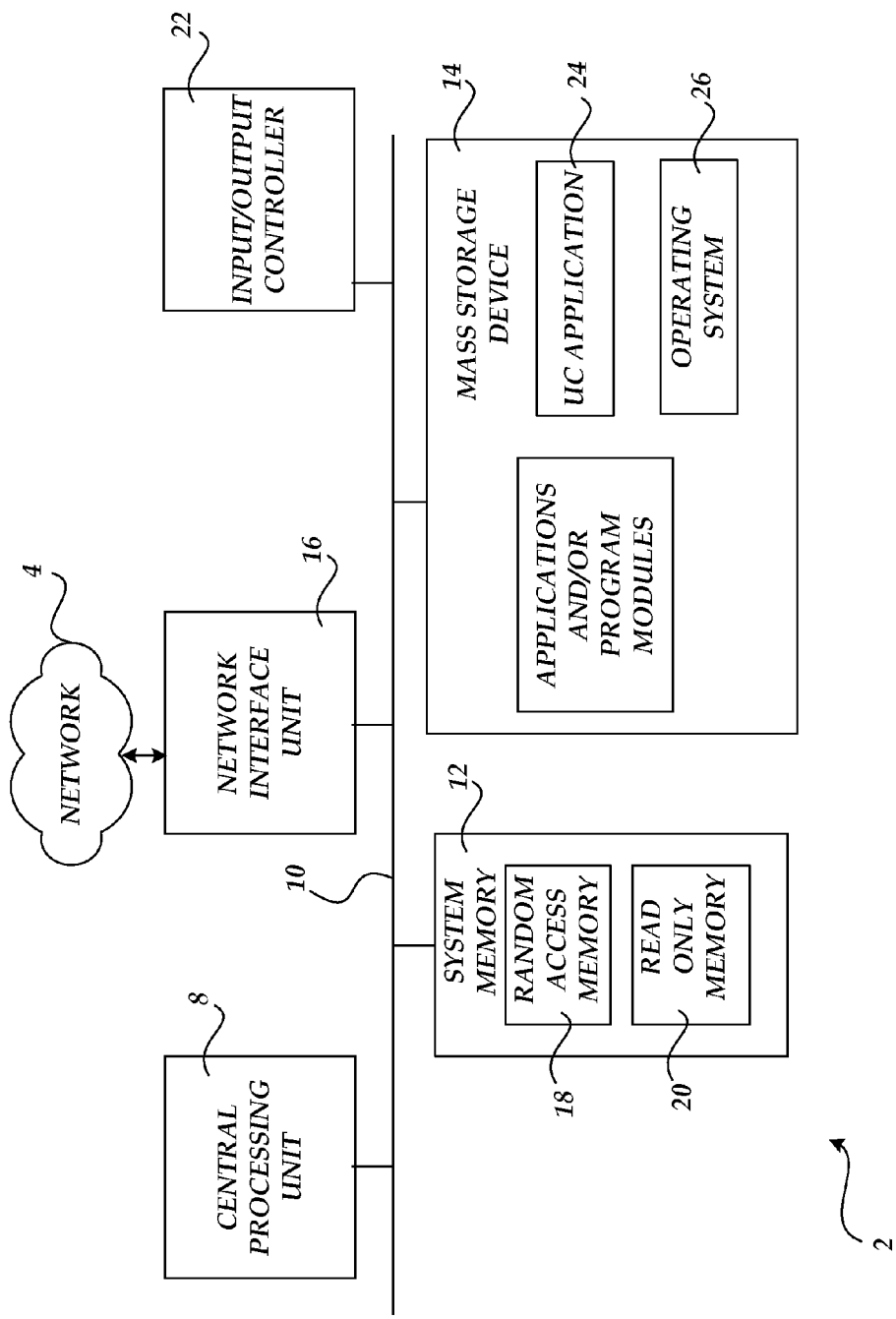
FIG. 7 is a block diagram illustrating an exemplary computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computing device 2 comprises a general purpose desktop, laptop, handheld, tablet, or other type of computer capable of executing one or more application programs. The computing device 2 includes at least one central processing unit 8 ("CPU"), a system memory 12, including a random access memory 18 ("RAM"), a read-only memory ("ROM") 20, a textual store 25, and a system bus 10 that couples the memory to the CPU 8. A basic input/output system containing the basic routines that help to transfer information between elements within the computer, such as during startup, is stored in the ROM 20.

The computing device 2 further includes a mass storage device 14 for storing an operating system 26, application programs, and/or other program modules. The mass storage device 14 is connected to the CPU 8 through a mass storage controller (not shown) connected to the bus 10. The mass storage device 14 and its associated computer-readable media provide non-volatile storage for the computing device 2. Although the description of computer-readable media contained herein refers to a mass storage device, such as a hard disk or CD-ROM drive, it should be appreciated by those skilled in the art that computer-readable media can be any available media that can be accessed or utilized by the computing device 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing device 2.

According to various embodiments, the computing device 2 may operate in a networked environment using logical connections to remote computers through a network 4, such as a local network, the Internet, etc. for example. The computing device 2 may connect to the network 4 through a network interface unit 16 connected to the bus 10. It should be appreciated that the network interface unit 16 may also be utilized to connect to other types of networks and remote computing systems. The computing device 2 may also include an input/output controller 22 for receiving and processing input from a number of input types, including a keyboard, mouse, keypad, pen, stylus, finger, speech-based, and/or other means. Other input means are available including combinations of various input means. Similarly, an input/output controller 22 may provide output to a display, a printer, or other type of output device. Additionally, a touch screen or other digitized device can serve as an input and an output mechanism.

As mentioned briefly above, a number of program modules and data files may be stored in the mass storage device 14 and RAM 18 of the computing device 2, including an operating system 26 suitable for controlling the operation of a networked personal computing device, such as the WINDOWS operating systems from MICROSOFT CORPORATION of Redmond, Wash. for example. The mass storage device 14 and RAM 18 may also store one or more program modules. The mass storage device 14, or other storage, and the RAM 18 may store other application programs or modules, including UC application 24.

The UC application 24 may be a separate application or an integral module of a hosted service application that provides advanced communication services through computing device 2. As discussed above, UC application 24 can operate to implement call reminders for incoming calls from various sources, but is not so limited. The UC application 24 can employ different methods to provide a call reminder. The UC application 24 can also provide advanced functionalities of a UC system to a user such as those associated with other forms of communication (video, instant messaging, etc.).

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of communicating in an integrated communication system, the method comprising:
   receiving a calling signal associated with a device communication, wherein the calling signal includes an identifier to identify a first party of the device communication;
   receiving a status signal associated with a status of the first party, wherein the status signal includes call reminder information associated with a call reminder;
   automatically creating the call reminder for the device communication using the call reminder information, wherein the call reminder includes a reminder type selected from a one-way reminder type for a calling party and a two-way reminder type for a called party and the calling party, recurring reminder settings, snooze option settings, a reminder time, and preferred end-point details associated with devices to call at particular times including end-point details for a first communication device to receive calls at certain times and a second communication device to receive calls at other times; and,
   scheduling a subsequent communication based in part on the call reminder information associated with the call reminder.

2. The method of claim 1, further comprising:
   receiving a diagnostic signal comprising client diagnostic information as part of an additional header as a result of an unavailable status of the first party and using the client diagnostic information for automatically creating the call reminder.

3. The method of claim 2, further comprising receiving the diagnostic signal as a result of a declining action associated with the first party, wherein the declining action includes a reschedule request including a reschedule time.

4. The method of claim 1, further comprising creating the call reminder for the first party.

5. The method of claim 1, further comprising creating the call reminder for the first party, wherein the first party is the called party, and creating a second call reminder for the calling party, wherein the second call reminder includes identification details of the called party.

6. The method of claim 1, wherein the identifier associated with the calling signal includes one of a caller ID number, a Session Initiation Protocol (SIP) Uniform Resource Identifier (URI), and an alphanumeric caller identifier.

7. The method of claim 1, wherein the receiving the status signal further comprises receiving a diagnostic signal that includes a call reminder request.

8. The method of claim 1, further comprising providing the call reminder to each communication device according to the preferred end-point details and communicating with a server maintaining the call reminder.

9. The method of claim 1, further comprising creating the call reminder as part of a Voice Over Internet Protocol (VOIP) communication.

10. The method of claim 1, further comprising creating the call reminder as a result of a receiving a voicemail signal.

11. The method of claim 1, further comprising creating the call reminder for the device communication including creating one of a call reminder subject, an importance level, and a call endpoint.

12. The method of claim 1, further comprising notifying the first party to call with a toast including contact details and a contact endpoint.

13. A computer-readable storage medium with instructions stored thereon for facilitating communications in an integrated telephony system by:
   determining an availability of a called party for a communication including determining an identifier associated with the called party;
   automatically creating a reminder for a subsequent communication if the called party is unavailable, wherein the reminder includes a reminder type selected from a one-way reminder type for a calling party and a two-way reminder type for the called party and the calling party, a URI, contact details, recurring reminder settings, snooze option settings, preferred end-point details associated with particular call times including end-point details for a first communication device to receive calls at certain times and a second communication device to receive calls at other times, and a time for the subsequent communication; and,
   generating a notification associated with the reminder for the subsequent communication upon a reminder triggering event.

14. The computer-readable storage medium of claim 13, wherein the instructions facilitate communication by automatically creating the call reminder upon reaching a voicemail signal.

15. The computer-readable storage medium of claim 13, wherein the instructions facilitate communication by creating the reminder for a subsequent call if the called party declines a VOIP communication.

16. The computer-readable storage medium of claim 13, wherein the instructions facilitate communication by creating a call reminder for the calling party which includes a called party URI, called party contact details, a scheduled time, and the reminder type.

17. A communication system for facilitating user communications, the system comprising:

a communication device operable to transmit and receive communication signals including a calling signal which includes an identifier to identify a communication party and a status signal associated with a status of the communication party, the communication device further comprising a reminder application which operates to automatically create a reminder for a subsequent communication based in part on information associated with the status signal and a party schedule; and, a serving device operable to manage each reminder, wherein the serving device also includes call reminder information including recurring reminder settings, snooze option settings, preferred end-point details including end-point details for a first communication device to receive calls at certain times and a second communication device to receive calls at other times, and a reminder type selected from a one-way reminder type for a calling party and a two-way reminder type for a called party and the calling party for inclusion in the reminder.

18. The system of claim 17, wherein the serving device includes contact, scheduling, and identity information for inclusion in the reminder.

19. The system of claim 17, wherein the serving device comprises a server configured to manage contact, calendar, messaging, and email information.

20. The system of claim 17, wherein the communication device is one of wireless device and a wired device.

* * * * *